US011833820B2

(12) United States Patent
Czinkota et al.

(10) Patent No.: US 11,833,820 B2
(45) Date of Patent: Dec. 5, 2023

(54) PRINTER NOZZLE STRUCTURE

(71) Applicant: Laser Engineering & Development ltd., Victoria (MT)

(72) Inventors: Imre Czinkota, Budapest (HU); Gabor Molnar, Kecskemet (HU); Viktor Tabor, Budapest (HU); Robert Bobrovniczki, Szekesfehervar (HU); Peter Bajcsi, Szentendre (HU)

(73) Assignee: Laser Engineering & Development ltd., Victoria, MT (US)

( * ) Notice: Subject to any disclaimer, the term of this patent is extended or adjusted under 35 U.S.C. 154(b) by 51 days.

(21) Appl. No.: 17/518,216

(22) Filed: Nov. 3, 2021

(65) Prior Publication Data
US 2022/0143976 A1    May 12, 2022

(30) Foreign Application Priority Data
Nov. 12, 2020   (EP) ..................................... 20207252

(51) Int. Cl.
*B41J 2/14*   (2006.01)

(52) U.S. Cl.
CPC .................................. *B41J 2/1433* (2013.01)

(58) Field of Classification Search
CPC ....................................................... B41J 2/1433
See application file for complete search history.

(56) References Cited

U.S. PATENT DOCUMENTS

| | | | |
|---|---|---|---|
| 5,348,604 A | 9/1994 | Neff | |
| 6,056,388 A | 5/2000 | Maximovsky et al. | |
| 6,217,695 B1 | 4/2001 | Goldberg et al. | |
| 9,339,972 B2 | 5/2016 | Gordon | |
| 10,449,560 B2 | 10/2019 | Ohno et al. | |
| 2009/0230099 A1 | 9/2009 | Aalto et al. | |
| 2014/0088751 A1 | 3/2014 | Pridoehl et al. | |
| 2015/0140155 A1* | 5/2015 | Ohno | B29C 64/264 425/375 |
| 2015/0314532 A1 | 11/2015 | Gordon | |

(Continued)

FOREIGN PATENT DOCUMENTS

| | | |
|---|---|---|
| CN | 103895227 A | 7/2014 |
| CN | 106587643 A | 4/2017 |

(Continued)

*Primary Examiner* — Jason S Uhlenhake
(74) *Attorney, Agent, or Firm* — Dorsey & Whitney LLP

(57) ABSTRACT

A nozzle structure for discharging printing material onto a substrate is presented. The nozzle structure comprises a tubular member having a distal part that faces the printing plane when in operation and defining an elongated inner cavity along the tubular member for placement a filament printing material. The tubular member comprises light input ports on the proximal part thereof for directing light toward inner surfaces thereof. The tubular member has an elongated tube portion and a distal tip portion at the distal part thereof, configured and operable as a light guide trapping and guiding the input light along the tubular member in a general direction toward the distal part, thereby continuously transferring light field to distal regions of the elongated inner cavity. The distal tip portion is configured to allow the trapped light to escape towards the printing plane, thereby heating a location on the printing plane facing the nozzle.

18 Claims, 5 Drawing Sheets

(56) References Cited

U.S. PATENT DOCUMENTS

| | | | |
|---|---|---|---|
| 2016/0059488 A1 | 3/2016 | Pridoehl et al. | |
| 2016/0096105 A1 | 4/2016 | Cove | |
| 2016/0194233 A1 | 7/2016 | Van Pelt | |
| 2016/0207263 A1 | 7/2016 | Gordon | |
| 2016/0230283 A1 | 8/2016 | Tseliakhovich et al. | |
| 2016/0346875 A1* | 12/2016 | Bruck | B23K 26/34 |
| 2016/0354977 A1* | 12/2016 | Gordon | B33Y 30/00 |
| 2017/0050198 A1 | 2/2017 | Ohno et al. | |
| 2017/0072633 A1 | 3/2017 | Hsu | |
| 2017/0087767 A1 | 3/2017 | Grewell | |
| 2017/0173692 A1 | 6/2017 | Myerberg et al. | |
| 2020/0199514 A1 | 6/2020 | Hauser et al. | |
| 2021/0229352 A1 | 7/2021 | Gjovik et al. | |

FOREIGN PATENT DOCUMENTS

| | | |
|---|---|---|
| CN | 107127971 A | 9/2017 |
| CN | 110901048 A | 3/2020 |
| DE | 102014004011 A1 | 9/2015 |
| DE | 102016006247 A1 | 11/2017 |
| DE | 102018109131 A1 | 10/2019 |
| EP | 3137286 A1 | 3/2017 |
| UA | 61468 A | 11/2003 |
| WO | 2015167896 A1 | 11/2015 |
| WO | 2018026909 A1 | 2/2018 |
| WO | 2018207037 A1 | 11/2018 |
| WO | 2019226815 A1 | 11/2019 |

\* cited by examiner

PRINTER NOZZLE STRUCTURE

TECHNOLOGICAL FIELD AND BACKGROUND

The invention is generally in the field of printing techniques of the type utilizing solid or semi-solid printing materials and relates to the structure of a nozzle unit suitable to be implemented in a print-head, in particular suitable for 3D printing.

Printer nozzles, in particular those used in 3D printers, are typically configured for depositing molten filaments onto a printing surface. A printing process is typically implemented using a scan mode, i.e., moving the print-head, including an array of nozzles, relative to a printing plane, and possibly also displacing the printing surface with respect to the printing plane.

It is a common goal of the printing techniques to enable fast and high-quality printing. Printing speed can generally be increased by locally preheating the already solidified surface area of the printing surface, to thereby increase bonding between the discharged drops of printing material (ink) and the printing surface. Such preheating of the printing surface is required to increase the yield and productivity of the printing process. Various techniques have been developed to improve the printing process by preheating the printing surface using light. Such techniques are described, for example, in the following patent publications: DE 102016006247; DE 102014004011; U.S. Pat. No. 10,449,560.

GENERAL DESCRIPTION

There is a need in the art for a novel printer nozzle structure, in particular useful for 3D printing techniques, such as Fused Filament Fabrication (FFF) or Fused Deposition Modeling (FDM), in order to enable high-speed and high-quality printing, advantageously applicable for large scale/large format printing using conventional size printers.

One of the greatest difficulties in implementing large scale/large format printing is that printing time is exceedingly long compared with the printing speed of conventional sized printers. This makes conventional sized printers for large scale printing technically impracticable.

Some other problems with large scale printing are that mechanical pins that bridge large diameters that are required for large scale printing are not sufficiently rigid to keep a relatively heavy print-head system strictly aligned with a printing surface (substrate) during movement of the print-head. Consequently, such mechanical pins tend to bend. On the other hand, if rigid enough mechanical pins are used, their mass is prohibitively high.

The present invention is aimed at improving filament extrusion and printing layer (substrate) cohesion to thereby enable high-speed high-quality printing suitable for a large-scale printing process. This is achieved in the present invention by a novel configuration of a print-head nozzle, having a light guiding body surrounding a filament, which provides a proper filament melting pattern towards an output of the nozzle and pre-heating of a substrate facing the output of the nozzle which together optimize the discharge of drops of ink filament and formation on the discharged drops on a substrate printing surface. A print-head system using such nozzles provides for desirably increasing the printing speed and reducing the print-head mass thus facilitating the movement pattern of the print-head while printing.

It should be understood that warming and melting the filament with light offers two advantages. Firstly, by the appropriate adjustment of the light (i.e., its power and propagation pattern) the heating capacity can be regulated fast and efficiently. Secondly, the light guiding nozzle is expected to be lighter than an electrically heated metallic print-head. Fast adjustment of the light and guiding conditions causing continuous interaction of the filament along its length with the light field produced by light propagation through the light guiding body allows precise filament heating with the appropriate feedback; and the lighter print-head allows faster and more precise movement thereof, as well as allows that the print-head movement mechanics can be less robustly built.

The nozzle structure of the present invention provides for continuous melting of the filament material inside the nozzle, while simultaneously preheating the respective region/location of the printing surface, using a common heat source constituted by light field propagation through the nozzle and continuous interaction with the filament. With this configuration, the requisite bonding and cohesion is provided by local heating by light the printing surface region onto which the drop of filament material is being discharged, eliminating a need to preheat the entire printout.

More specifically, the nozzle is configured as an elongated light guiding body defining an inner cavity for containing an elongated filament. The elongated tubular-like body has inner and outer walls extending between proximal and distal end portions of the body. The inner walls of the tubular body confine the inner cavity along the length thereof. Such inner cavity is further defined by a proximal opening for allowing introduction of the filament of the printing material therein, and a distal opening for allowing discharge of the drops of melted filament from the inner cavity onto the printing surface. Thus, the tubular light guiding body surrounds the filament and guides input light beam(s), properly entering the light guiding body, at its proximate portion and/or in one or more intermediate regions along the light guiding body, to propagate in a general propagation direction, from the proximal portion of the body to a distal end thereof by which the body faces the printing surface, while causing the propagating light beam(s) to interact with successive regions of the inner cavity (i.e., successive regions of the filament).

Generally, operating as a light guiding body, the elongated tubular-like body is transparent to light of one or more wavelength ranges selected for heating the filament. In this connection the term "light" as used herein relates to electromagnetic radiation in one or more selected wavelength ranges, typically including visible and infrared illumination. For example, the present technique may utilize electromagnetic radiation in wavelength range between 400 nm and 2.5 micrometer, herein considered as "light". In some configurations, the present technique may utilize infrared illumination in wavelength range between 800 nm and 1.5 micrometer, or between 900 nm and 1100 nm.

By this, energy produced by the propagating light field, with continuously transmitting energy due to multiple reflections from the internal surfaces of the walls of the light guiding body, is continuously transferred towards successive regions of the elongated inner cavity. This provides that, when the filament is located in the inner cavity, light energy interaction with the filament affects continuous heating of the filament along its length towards the melting state at a region of the filament aligned with the distal part/end of the nozzle body, to thereby create a drop of the filament material being discharged from the nozzle onto a location on the substrate.

By configuring the nozzle as a heat resistant transparent tubular-like body made of a material which has a refractive index larger than that of surrounding media (typically air), and having light input port(s) causing diverging input light to be properly incident into the internal surfaces of the tubular-like body (i.e. adequately low angle incidence relative to the longitudinal axis of the body), the light can be completely (or substantially completely) trapped to propagate through the tubular-like body and substantially not released into the environment. It should be understood that, generally, the shape of the tubular-like body can be totally cylindrical. However, if the refractive index of the tubular-like body is sufficiently high compared to the surrounding media (typically air), the distal-end portion of the tubular-like member, by which it is brought to the printing plane (where the printing surface is located) may be narrowed down to further limit energy loss in the air.

Further, if the inner surface of the tubular body, defining the cavity for the filament placement, directly interacts with the filament (typically, made of plastic material that has a refractive index similar to the tube material), the light will be released on the inner surface, heating and melting the filament, which, in such a molten state, can be squeezed out through the nozzle body and bond with the printing surface to solidify. The light being reflected by the internal surfaces of the tubular-like body, as well as the light beams directly moving downwards through the body (from its proximal portion to its distal end portion facing the substrate), can be omitted at the distal end portion and beamed on the solidified printing surface, thereby heating and melting its topmost layer.

Thus, the present invention provides a printing nozzle structure to be used in a print-head to perform a printing process. The nozzle configuration enables to improve the speed and quality of the printing process by heating a semi-solid or solid printing filament inside the nozzle to thereby reduce the viscosity of the filament and thus facilitate flow of the filament material through the nozzle towards a surface region of a printing surface aligned with the nozzle, while said surface region is being concurrently heated by the same heat source, i.e. energy produced by the light field propagating along the light guide defined by the nozzle structure.

The printer nozzle of the present invention is thus configured as a light guide with respect to input light (typically laser light) having proper light entry conditions into the light guide, for dual function: (i) continuously heating the filament extending inside and along the inner cavity of the nozzle, and (ii) preheating a location of the printing surface onto which the drop of the melted filament material is being discharged from the nozzle.

The nozzle of the invention has an elongated tubular or toroidal-like body, being a single-part integral member, defining an elongated inner cavity for placement of a filament thereinside, such that the tubular body surrounds the filament along its length. The tubular body, at its proximal part, has light input ports, and, when in operation, is brought by its distal part close to a substrate on which the printing material is to be discharged while printing, via an output opening defined by the distal surface of the tubular body. The tubular body is configured and operable as a light guide for trapping input light, which enters the tubular body via the light input ports at the proximal part of the tubular member and, while diverging, interacts with and is reflected from the inner surfaces of the tubular body, such that the trapped light is guided to propagate along the tubular member, from its proximal part to its distal part, by multiple reflections from the inner interfaces of the tubular body (preferably, total internal reflections in a waveguide structure). This configuration of the nozzle provides that energy produced by the propagating light field, with continuously transmitting energy, due to multiple reflections, is continuously transferred towards successive regions of the elongated inner cavity. When the filament is located in the inner cavity, light energy interaction with filament provides that it is continuously heated. This configuration may allow gradual increase in amount of light energy to be absorbed by the filament along length of the tubular member towards the melting state at a region of the filament aligned with the distal part of the tubular body, to create a drop of the printing material being discharged from the tubular body of the nozzle onto a location on the substrate.

Preferably, the tubular body of the nozzle has a geometry defining a conically or funnel-like shaped tip-portion at the distal part of the nozzle. This brakes the light guiding condition (e.g., total internal reflection) for the light propagating through the tubular body, to allow the trapped light to escape through the distal part of the tubular member towards a printing plane (towards the substrate), thereby transferring light energy to heat the substrate on which the drop of the printing material is being discharged. On the other hand, such tip-portion concentrates the heating energy towards the location onto which the drop is being discharged.

Thus, the above configuration of the nozzle, while being simple (a single-unit integral tube-like member/body) provides, on the one hand, effective gradual transformation of the filament from a semi-solid phase thereof while inside the nozzle to a melted phase of the filament at a region thereof at the output from the nozzle, and, on the other hand, provides desired locally pre-heated condition of the substrate at a location facing the output of the nozzle to interact with the drop of the filament material being discharged on said location.

In case multiple laser beams are used to input the nozzle and propagate therethrough at different angles, the light output at the bottom (distal end) of the nozzle which is absorbed by the filament may be adjusted to allow for precise regulation of the surface preheating and filament melting during the printing process.

In accordance with the filament material, as well as the shape of the printing surface (e.g., planar or curved surface), complete adjustment of the light input provides sufficient heating capacity for printing, as adjusted by the heating requirements with very short delay times. More specifically, the entrance angle and position of the input light ports within the proximal end portion of the light guiding body is determined to obtain a desired relation between the amount of light field being transferred into the inner cavity and the amount of light field being transferred towards the printing surface, namely the relation between energy going to the filament melting and energy going to the local printing surface heating.

Thus, according to one broad aspect of the invention, there is provided a nozzle structure for use in a print head for discharging drops of a printing material onto a substrate located in a printing plane, the nozzle structure comprising:

a tubular member having a distal part by which it faces the printing plane when in operation, said tubular member defining an elongated inner cavity along the length of the tubular member for placement of a filament of the printing material in said inner cavity, said tubular member being configured for light propagation through at least a portion thereof, said tubular member comprising at least one light input port on the proximal part thereof and being configured for light propagation therethrough along a general propagation direction from the proximal part to the distal part; wherein the at least one light input port is configured for directing diverging input light beam towards inner surfaces of the tubular member with a predetermined incidence onto said inner surfaces;

the tubular member comprises (or has integrally made) an elongated tube portion and distal tip portion at the distal part of the tubular member, the elongated tube portion of the tubular member is configured and operable as a light guide for trapping input light, entering said elongated tube portion via the light input ports at the proximal part of the tubular member, and guiding the trapped light propagation along the tubular member by reflections from inner surfaces of the tubular member, thereby continuously transferring increasing amount of light field to successive regions of said elongated inner cavity from the proximal part of the tubular member towards the distal part thereof; and distal tip portion of the tubular member has a cross-sectional geometry different from that of the elongated tube portion to affect light reflections from the inner surfaces of the tubular member and allow the trapped light to escape through the distal part of the tubular member towards the printing plane, thereby interacting with and heating a location on the printing plane facing the distal part.

The geometry of the nozzle's body and proper size of the light input ports (apertures) at the proximal part of the body enable to create the light guiding condition by reflections (substantially total internal reflection condition) for the light being input and maintain this condition all along the body until its tip-portion at the distal part of the nozzle. In other words, an elongated proximal part of the tubular body may be configured as a waveguide-like unit, while its much shorter and narrower distal part (tip-portion) allows the light to be output from the tubular body towards the substrate to execute local heating.

The tubular member is preferably made of a material with a refractive index substantially matching a refractive index of the filament material. For example, the nozzle's body may be made of glass. Generally, the tubular member may be transparent with respect to the wavelength range of light use, e.g., visible or infrared illumination. The filament material may be partially transparent or opaque and is generally absorbing light of the respective wavelength range, thereby enabling effective heating thereof. In this connection, the tubular member may be formed of one or more glass types that are transparent to light in selected infrared wavelength range, typically up to wavelengths of about 2-3 micrometers, allowing light of the selected wavelength range to be guided and/or transmitted to provide heating of the filament and/or the printing region. Such glass materials may be selected from BK7 (borosilicate crown glass), Fused Silica/quartz or other suitable glass types.

It is to be noted that the term "substantially matching" should be understood that the range of first value is in the range of ±20% from the second value or vice versa. For example, the refractive index of the filament should be in the range of ±20% from the value of the refractive index of the material of the light guiding portion.

In some embodiments, the tubular body of the nozzle is configured such that its inner cross-sectional dimension (e.g., diameter) is slightly larger than that of the filament defining a small/narrow gap between the filament and the inner cavity walls.

Preferably, the tubular member, made of the material with the refractive index substantially matching the refractive index of the filament material, is configured to define the inner cavity having a cross-section geometry substantially matching that of the filament. As a result, the filament, when placed in the inner cavity, interfaces the surface of the cavity (i.e. inner walls of the tubular member) along its circumference, creating an elongated structure formed by the tubular member and the filament which presents a light guide for trapping the input light and guiding its propagation along said elongated structure while continuously heating the filament, due to light absorption by the filament along its length, towards a distal part of the filament aligned with the distal tip portion of the tubular member. Thus, the major portion of the filament aligned with (extending along) the elongated proximal part of the tubular body forms together with said elongated portion of the tubular body a common light guide, effecting absorption of the light by the filament body, thereby even more optimizing the heating of the filament and the heat distribution pattern along the filament body. In other words, when the filament directly interfaces with the inner surfaces of the tubular body, some of the light is allowed to pass through the inner surfaces to interact with a portion of the filament, thus being absorbed by the filament and heating it and continuing its propagation towards the distal part of the tubular member, i.e., towards the tip portion.

In some embodiments, the nozzle structure is additionally provided with intermediate light input port(s) arranged at some location(s) on the light guiding portion of the tubular member between the proximal portion thereof and the distal tip portion. Light entering the tubular member via these intermediate light input port(s) is incident onto the internal walls at such angles (e.g., substantially perpendicular to the longitudinal axis of the tube) that it is substantially transmitted through the inner walls towards the inner cavity to be absorbed by the filament, when placed in the inner cavity, facilitating its melting.

In some embodiments, the tubular member may be configured to allow transmission of light on a path intersecting to an axis defined by said elongated tube portion, thereby enabling input light beamed toward the tubular member externally of said nozzle structure to pass through said tubular member and further interact with and heat filament inside said tubular member. In some embodiments, input light may be directed into the tubular member via input ports positioned in proximal part thereof, allowing such input light to be directed through the tubular member by light guiding, and additional input light may be directed at the filament, being transmitted through walls of the tubular member, being directed in a path intersecting with an axis defined by said elongated tube portion, to be transmitted through said tubular member and absorbed by the filament therein. For example, such additional input light may be directed at the tubular member 204 at an angle range between 60 degrees and 120 degrees with respect to an axis defined by said elongated tube portion.

According to another broad aspect of the invention, there is provided a print-head system comprising: a nozzle arrangement comprising an array of nozzles, each configured as the above-described nozzle structure; and a light source system configured and operable to produce a plurality of light beams and optically couple said plurality of light beams to the light input ports on the proximal portions of the tubular members of the nozzles.

In some embodiments, the light source system comprises a plurality of light sources, each one or more of the light sources being directly optically coupled to respective one or more light input ports of the respective one of the nozzles in said array of nozzles.

In some embodiments, the light source system comprises one or more light sources and a plurality of optical fibers, wherein each of the optical fibers is by its one end optically coupled to the light source and by its other end is optically coupled to a dedicated one of said light input ports.

In some embodiments of the print-head system, the light source system is configured to provide light in the visible and/or infrared spectra, e.g., in the wavelength range between 350 and 1500 nm. In some embodiments, the light source system is configured to provide illumination in wavelength range between 800 nm and 1500 nm. In some embodiments the light source system is configured to provide illumination in wavelength range between 900 nm and 1100 nm.

In some embodiments, the light source system is configured to output laser light in a power range of 10 to 300 Watts, preferably, 50 Watts.

In some embodiments, the print-head system also includes a sensing system for sensing various parameters/conditions of the filament in the nozzle (temperature, viscosity, etc.), as well as light sources system parameters (e.g., wavelength and output capacity of laser(s)), and light propagation conditions (e.g., optical coupling to the light input ports to keep the light guiding conditions). The print-head system typically includes a control system for controlling the printing process, including inter alia filament feeding mechanism controller, movement pattern controller. Such control system may thus also include one or more controllers for controlling the printing process based on sensing data provided by the sensing system.

For example, the output capacity of the light source (laser system) may be regulated according to the sensed temperature of the filament and/or according to the viscosity of the filament.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

The following figures are provided to exemplify embodiments and realization of the invention of the present disclosure.

Figure 1:
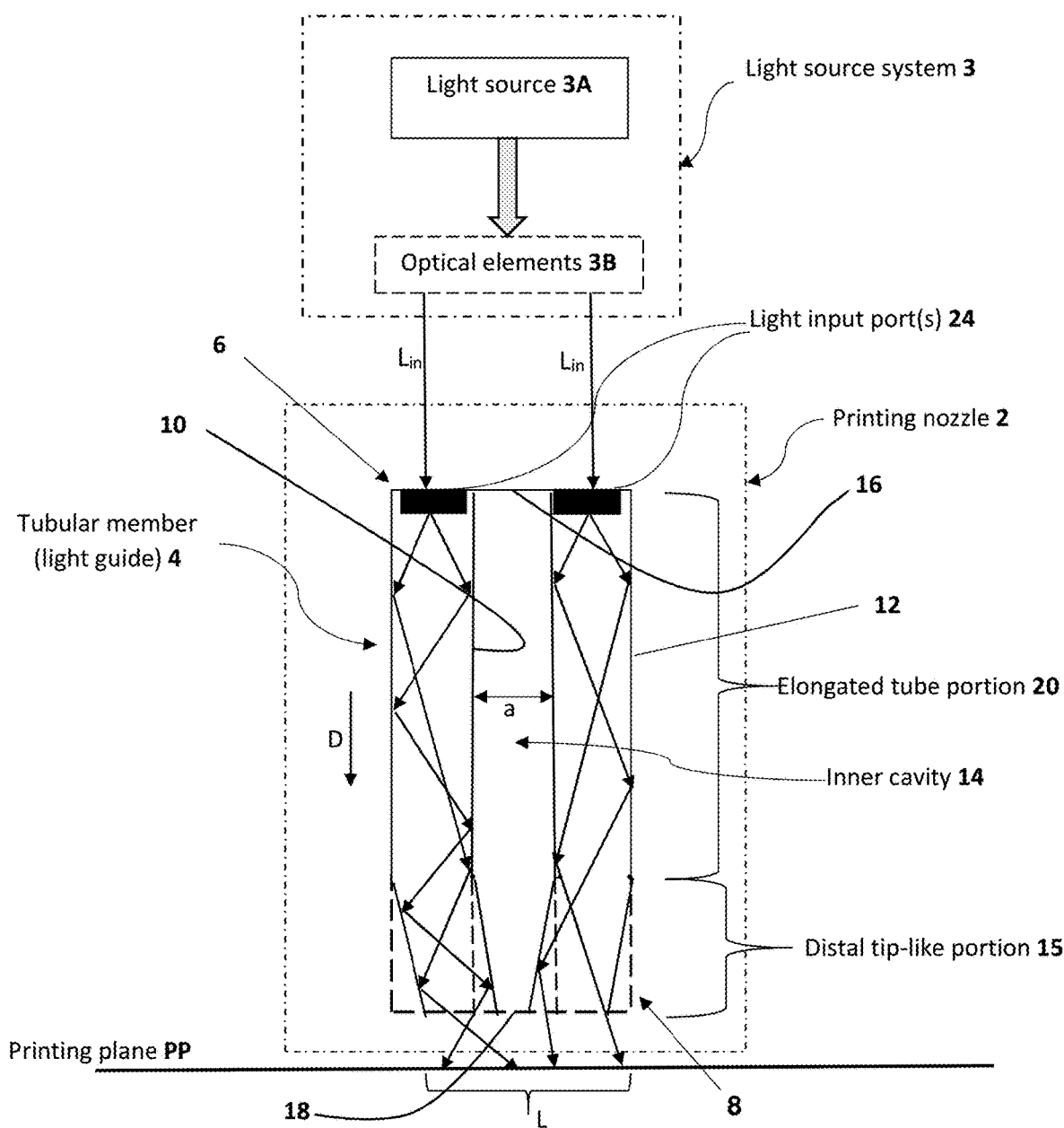
FIG. 1 is a block diagram of a nozzle structure of the present invention suitable for use in a print-head system.

Referring to FIG. 1, there is illustrated, by way of a block diagram, a printer nozzle 2 configured and operable according to the invention. The printer nozzle 2 is configured for use in a 3D printing process of the FFF/FDM type that uses a continuous filament of a thermoplastic material.

The nozzle unit 2 includes a tubular member 4 (tubular-like body) having a proximal part 6 and a distal part 8, by which it faces a printing plane PP when brought to operation. The tubular member 4 defines an elongated inner cavity 14 of cross section dimension(s) a suitable for placement of a filament of the printing material in the inner cavity via an opening 16 and discharging a melted filament drops via an opening 18. The tubular member is configured as a light guide for guiding input light $L_{in}$ propagation from light input ports 24 properly configured on the proximal part 6 of the tubular member 4 towards its distal part 8, via reflections from outer and inner walls 12 and 10 of the tubular member.

The light input ports (apertures) 24 are optically coupled to a light source system 3, including light source(s) 3A and possibly also optical elements 3B (e.g., one or more lenses and/or optical fibers). Optical elements 3B are configured to couple output light from the light source 3A into light input ports 24 of the printing nozzle 2. Light generated by the light source system into the nozzle, together with the nozzle configuration defining light guiding channel, forms a heat source for heating a filament inside the inner cavity of the nozzle and perform local preheating of a printing surface onto which melted filament is being discharged from the nozzle.

The optical coupling, defined, inter alia, by the material of the tubular member (its refractive index relative to the surroundings), wavelength of light, geometry of the apertures and their location with respect to the walls of the 10 and 12, is such that light beam(s) being entered into the tubular body is/are properly diverging to be incident onto the walls with substantially critical angle to be trapped in the tubular member. As a result, the input light undergoes multiple reflections from the walls 10 and 12 while propagating through the tubular member in a general propagation direction D from the proximal part 6 to the distal part 8.

The shape of the tubular member 4 can be totally cylindrical, as shown in the figure by dashed lines. However, preferably, it includes, or has integrally made, a proximal elongated tube portion 20 and a (shorter) distal funnel-like or tip-like portion 15. With this configuration, the elongated tube portion 20 is configured and operable as a light guide (e.g., waveguide) for trapping the input light and guiding its propagation along the tubular member by reflections from the inner surfaces of the walls 10 and 12, thereby continuously transferring light field to successive regions of the elongated inner cavity from the proximal part towards the distal part of the tubular member. This may cause increase of temperature in the filament material along the inner cavity due to increasing amount of energy transmitted thereto. The distal tip portion 15 has a cross-sectional geometry different from that of the elongated tube portion 20 and thus affects light reflections and allows the trapped light to escape through the distal part 15 towards a region/location L on the printing plane, thereby causing local heating of the printing plane facing the distal part 15.

Figure 2:
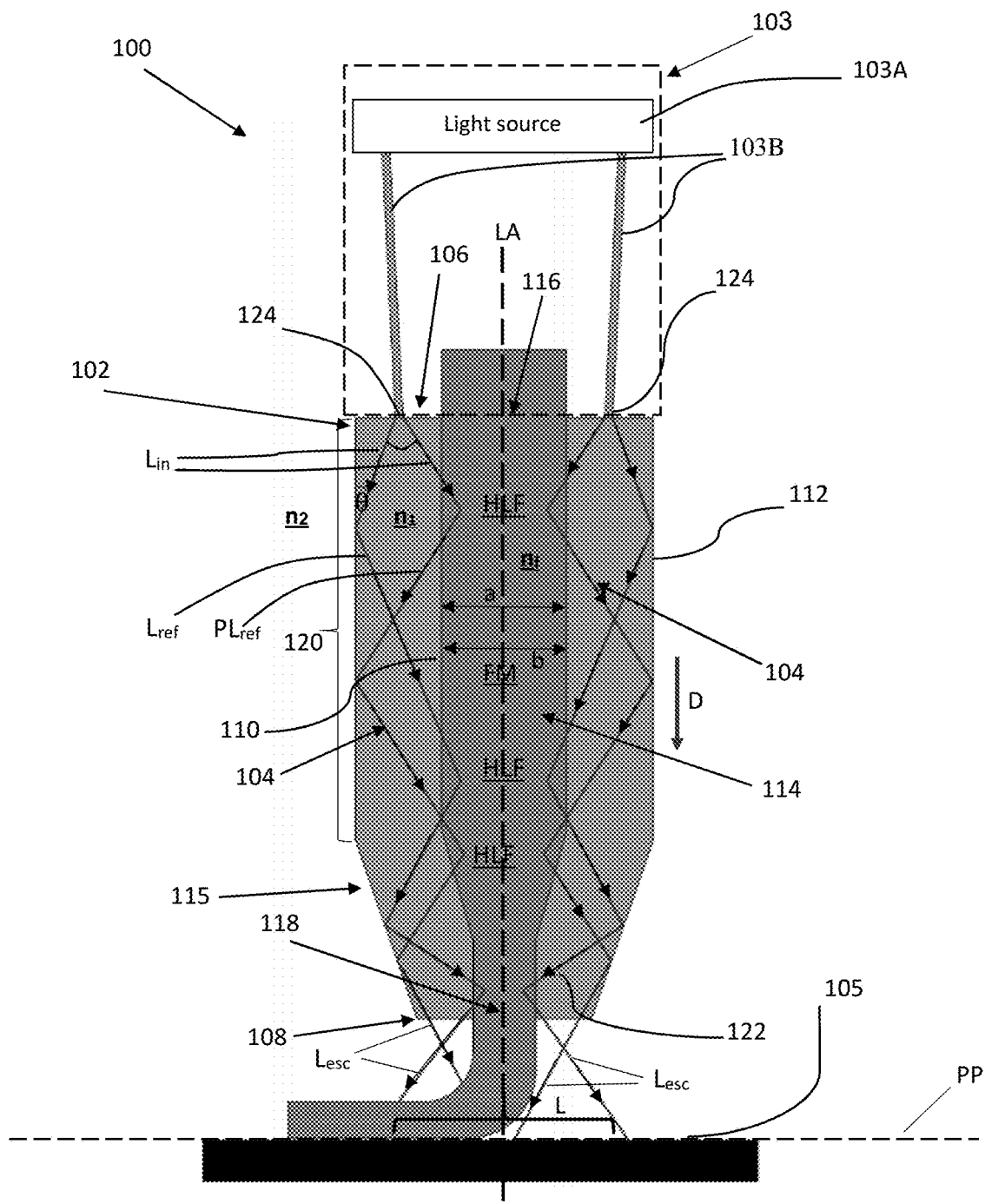
FIG. 2 is a schematic cross-sectional view of a printer nozzle structure according to some embodiments of the present invention.

Reference is made to FIG. 2, schematically exemplifying configuration and operation of a printer nozzle assembly 100 utilizing a printer nozzle structure 102 according to some embodiments of the present invention. To facilitate illustration and understanding, in the figures, like elements of different figures are given similar reference numerals shifted by the number of hundreds corresponding to the number of the respective figure. For example, element 104 in FIG. 2 serves the same function as element 4 in FIG. 1.

The printer nozzle unit 100 includes the nozzle 102 associated with a light source system 103. The light source system 103 may produce high capacity visible or infrared light in the wavelength range of 350-1500 nm suitable to melt the filament. To this end, the light source system may utilize laser(s) having output range of 10-300 Watts (preferably at a peak performance of 50 Watts). The output capacity of the laser is regulated according to the temperature of the filament and/or according to the viscosity of the filament, i.e., in order to the feed powder of the filament material.

The light source system may include one or more laser sources, which may be directly integrated into the print-head or may be optically coupled to the print-head via optical fibers. As shown in the present non-limiting example, the light source system includes a light source unit (one or more light sources) 103A and optical fibers 103B. Alternatively, or additionally, light source system 103 may utilize non-coherent light source, such as light bulb or other lights sources (electromagnetic radiation sources) and may include optical focusing elements for focusing/directing emitted light.

The printer nozzle 102 is configured for discharging drops of a printing material onto a printing surface 105 (of a substrate) located in a printing plane PP. The nozzle 102 has a body in the form of an elongated tubular member 104 extending between a proximal end/part 106 and a distal end/part 108 of the nozzle's body. The distal part 108 is that by which the nozzle faces the printing plane PP when in operation. Such tubular member has inner walls 110 and outer walls 112, such that the outer walls 112 of the tubular member 104 are exposed to the surroundings, and the inner walls 110 of the tubular member 104 confine a volume defining an elongated inner cavity 114 along the length of the tubular member 104 for placement of a filament FM of the printing material in the inner cavity 114. The inner cavity volume is further defined between a proximal opening 116 at the proximal end 106 of the tubular member 104 for allowing introduction of the filament material FM into the inner cavity 114 and a distal opening 118 at the distal end 108 of the tubular member 104 for allowing drops of the melted filament FM to be discharged therethrough and thereby to be applied onto the printing surface 105.

The tubular member 104 is configured for light propagation through at least a portion thereof and includes light input ports (apertures) 124 properly configured and arranged on the proximal part 106 of the tubular member to allow light entry into the tubular member and propagation through the tubular member in a general propagation direction D along a longitudinal axis LA of the tubular member from the proximal part to the distal part of the member 104.

The tubular member 104 is made of a heat resistant transparent material (e.g., glass) which has a refractive index $n_1$ larger than refractive index $n_2$ of surrounding air environment. The light input ports 124 are configured for directing a diverging input light beam $L_{in}$ towards internal surfaces of the inner and outer walls of the tubular member 104 with a predetermined angle of incidence $\theta$ onto said internal surfaces to be guided, by reflections/refractions from the internal surfaces, through the tubular member towards its distal end portion.

More specifically, the tubular member 104 has an elongated tube portion 120 and a funnel-like or tip portion 115 at the distal part of the tubular member (e.g., integrally made). The elongated tube portion 120 is configured and operable as a light guide for trapping input light $L_{in}$, entering said elongated tube portion via the light input ports 124 at the proximal part 106 of the tubular member, and guiding the trapped light propagation along the tubular member by reflections $L_{ref}$ and partial reflections $PL_{ref}$ from the internal surfaces of the tubular member. As shown in the figure, by this transmitting heating light field HLF is continuously heating successive regions of the filament in the elongated inner cavity 114 from the proximal part 106 of the tubular member towards the distal part 108 thereof. Preferably, the elongated tube portion 120 with the light input apertures on the proximal end portion thereof is configured as a waveguide for guiding the input light propagation along the elongated tube portion towards the distal tip portion by total internal reflection condition.

The distal tip portion 115 of the tubular member 104 has a cross-sectional geometry different from that of the elongated tube portion 120 such that the tip portion, while affecting light reflections from the internal surfaces thereof, allowing light components $L_{esc}$ of the trapped light to escape through the walls of the distal part 115 towards the printing plane PP. These light components $L_{esc}$ thereby propagate towards and interact with a region/location L on the printing plane PP facing the distal part 115 thus heating this location by the light field. This region/location includes a location onto which a drop of the melted filament material is being discharged onto the printing surface 105 via the opening 118. More specifically, the configuration is such that the inner cavity 114 has a funnel-like shape at its distal portion 115, thereby resulting in that the cross-sectional dimension of the distal opening 118 is smaller than the cross-sectional dimension of the proximal opening 116.

Thus, input light in enters the tubular member 104 via the apertures at the proximal end portion 106 and propagates towards the distal end 108, while interacting with the internal surfaces of the inner walls 110 and the outer walls 112. The interactions with the walls can result in any one of: (i) total reflection; (ii) partial reflection/transmission; or (iii) total transmission. The result of the interactions is determined by the type of the light (wavelength), incident angle onto the walls, the refractive index $n_1$ of the tubular member, the refractive index $n_2$ of media interfacing the outer walls 112, e.g., air, and a refractive index $n_3$ of media of the inner cavity 114 interfacing the inner walls 110.

Generally, the above parameters are properly selected for the configuration and operation of the printer nozzle 102 to obtain maximal reflections in the interactions of the light with the outer walls 112 and at least partial transmission in the interactions of the light with the inner walls 110 such that the light is transmitted to the inner cavity 114 to interact and be absorbed by the filament FM when placed in the inner cavity 114. Preferably, the tubular material has refractive index $n_1$ substantially matching a refractive index $n_f$ of the filament FM, i.e., $n_1 \approx n_f$.

As will also be exemplified further below with reference to FIGS. 3A and 3B, cross-sectional dimension a of the inner cavity 114 may be somewhat larger than a cross-sectional dimension (diameter) b of the filament, thus leaving a small gap g between the inner walls of the tube and the filament.

Preferably, however, as exemplified in FIG. 2, the cross-sectional dimension a of the inner cavity 114 substantially matches a cross-sectional dimension (diameter) b of the filament, i.e., $a \approx b$, such that the filament FM, along its circumference, directly interfaces the inner walls 110 of the tubular member 104. Hence, light impinging on the internal surface of the inner wall 110 interacts with the filament FM (having substantially the same refractive index as the tubular member) and is at least partially absorbed in the filament material, thereby optimizing the heating and melting effects.

Once the filament is melted, it can flow through the distal opening 118 onto the printing surface thus implementing the printing process.

As further exemplified in FIG. 2, the funnel portion 115 of the tubular member may be configured to define a distal transmission region 122 being the most distal part/surface of the tubular member by which the nozzle is brought to the printing plane (printing surface). The remaining light components $L_{esc}$ that propagated from the proximal end portion 106 of the tubular member are transmitted through the distal transmission portion 122 and reach the printing surface 105 at the location L.

The light component $L_{esc}$ reaching the printing surface effect local preheating of an uppermost layer on which the print-head is about to print additional layer of molten filament, and/or heating of a portion of the filament that has just being applied onto the printing surface by the nozzle.

As shown in the specific but not limiting example of FIG. 2, light to be input into the tubular member 104, is guided from the external light source unit 103 (including one or more light sources 103A) via optical fibers 103B. It should however, be understood that the invention is not limited to this specific example. It should also be understood that multiple input light beams can be directed (continuously) into the tubular member 104 via an array (e.g., circular array) of spaced-apart apertures 124 provided on the proximal part 106 of the tubular member.

It should be understood that some of the heating energy (light field) optically coupled to the print-head nozzle is used for local preheating of the substrate under the printing surface. A shape of the preheating light spot and the light energy (capacity) distribution is created by the appropriate geometrical shape of the distal portion of the nozzle serving as the emission surface of the nozzle. It should also be understood that the nozzle configuration (geometry and optical properties) defines the optical propagation pattern of light through and out of the nozzle (i.e., position and the target angle of light) to create the appropriate proportions between filament melting and surface heating.

As described above, multiple light sources may be used, and the output of the light sources may be properly regulated in order to smoothly adjust the right capacity output between filament melting and surface heating. More specifically, in case multiple laser beams are used in the tubular member of the nozzle and beamed at different angles, the light output which is emitted at the bottom of the tube (distal portion) and which is absorbed by the filament may be adjusted to allow for precise regulation of the surface preheating and filament melting during the printing process. Based on the filament material, as well as the shape of the printing surface, the light input properties may be adjusted and optimized to provide sufficient heating capacity for printing, corresponding to the heating requirements with very short delay times.

It should be noted that, preferably, reflective coating is applied to all the surfaces of the nozzle that are not used to conduct energy, to reduce the loss of light available for heating.

FIG. 2 exemplifies the embodiment in which the inner cavity 114 is completely filled with filament material FM, i.e., the filament directly interfaces the inner walls of the tubular member entirely along its length, and the refractive index of the tubular member 104 (or, generally, at least its light guiding tube portion 120) substantially matches that of the filament material FM. Thus, light that propagates within the light guiding portion 120 and interacts with the inner walls 110 is substantially transmitted towards and at least partially absorbed by the filament material, thereby heating and melting it.

Figure 3A:
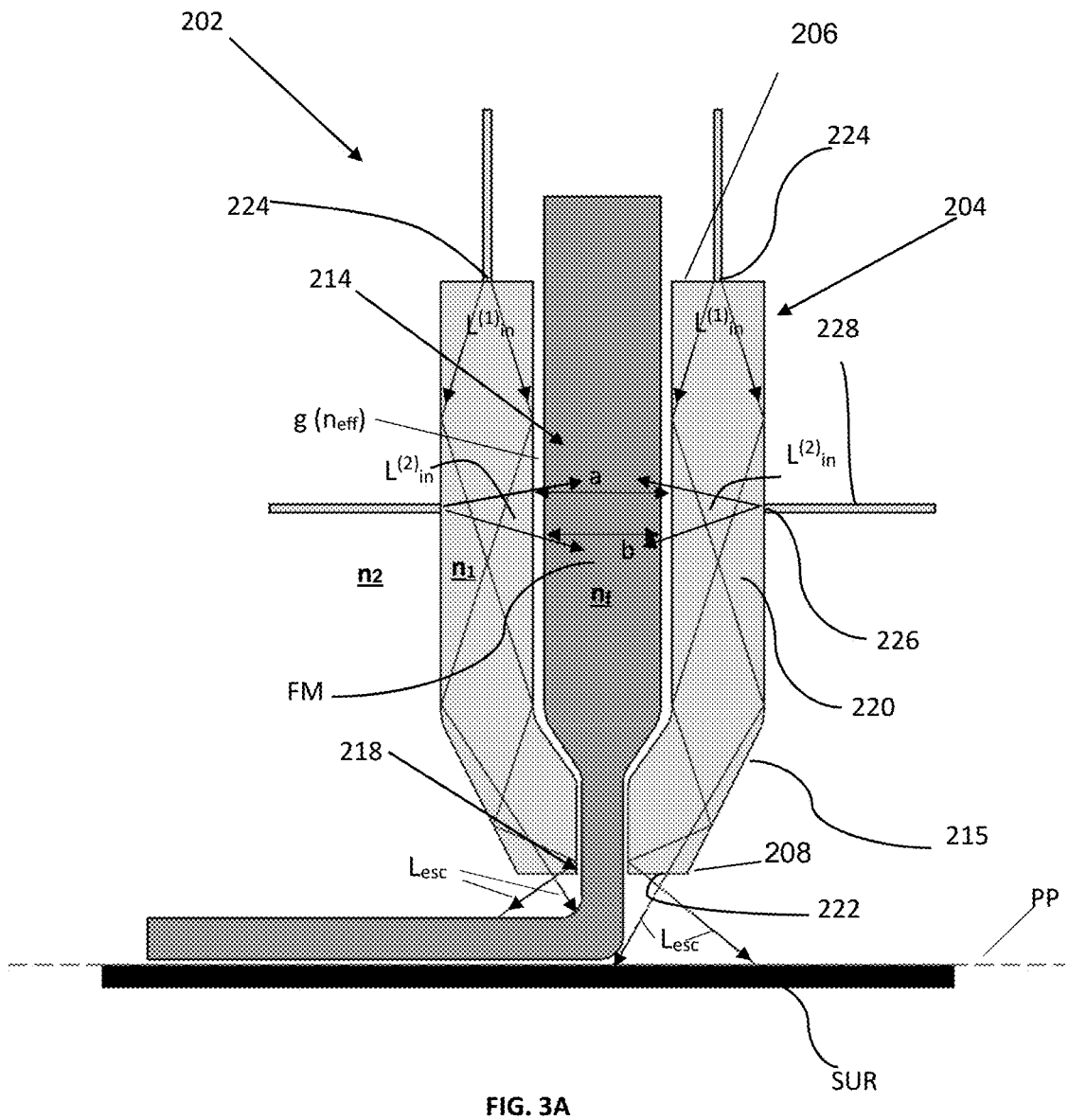
FIGS. 3A-3B are schematic illustrations of two non-limiting examples, respectively, of the printer nozzle configurations according to the present invention.
Figure 3B:
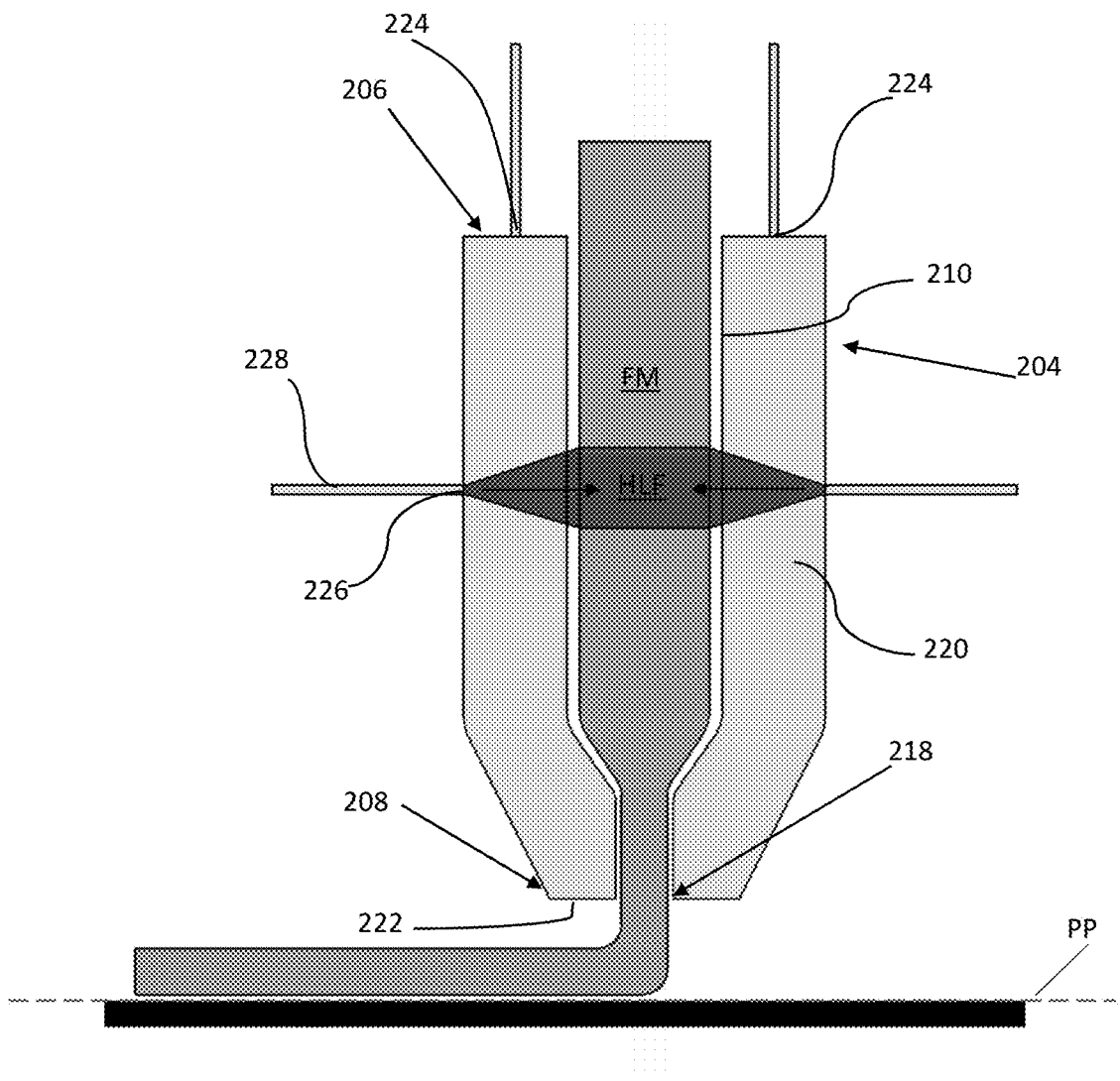

Reference is now made to FIGS. 3A and 3B schematically illustrating another non-limiting example of the configuration and operation of the printer nozzle structure of the present invention.

In the example of FIGS. 3A and 3B, the printer nozzle structure 202 is illustrated, as well as light propagation scheme therethrough (FIG. 3A). The printer nozzle structure 202, similar the above-described structure 102 of FIG. 2 (as well as general block-diagram illustration of the nozzle 2 in FIG. 1), is configured for discharging drops of a printing material onto a substrate located in a printing plane at the distal end of the nozzle structure. The printer nozzle structure 202, similar to those of FIGS. 1 and 2, includes a tubular member 204 having a proximal end portion 206 and a distal part 208 by which the tubular member 204 faces a printing plane PP when in operation. The tubular member 204 defines an elongated inner cavity 214 along the length of the tubular member 204 for placement of a filament FM of the printing material in said inner cavity. The tubular member is formed with light input ports 224 on the proximal part thereof 206, and is configured for light propagation therethrough along a general propagation direction from the proximal part towards the distal part which output the light onto the printing surface. The light input ports 224 are configured for directing diverging input light beams $L_{in}$ towards internal surfaces of the tubular member 204 with a predetermined angle of incidence. The tubular member 204 has an elongated tube portion 220 and a distal funnel-like tip portion 215 (e.g., integrally made). The elongated tube portion 220 is configured as a light guide for trapping input light $L_{in}$ and guiding the trapped light propagation by reflections from internal surfaces of the tubular member, thereby continuously transferring increasing amount of light field (heat field HLF) to successive regions of the elongated inner cavity from the proximal part of the tubular member towards the distal part thereof. The distal tip portion 215 has a cross-sectional geometry different from that of the elongated tube portion 220 to allow the light components $L_{esc}$ of the trapped light to escape through the distal part of the tubular member towards the region/location L on the printing plane PP aligned with the output opening 218 of the tubular member 204, thereby interacting with and heating the location on the printing surface onto which a drop of the filament is being discharged.

The nozzle structure example of FIGS. 3A and 3B differs from that of FIG. 2 in that the tubular member 204 includes additional intermediate light ports (apertures) 226 arranged at some locations downstream of the light input ports 224, with respect to the general light propagation direction, i.e., at some locations on the light guiding portion 220 in between the proximal end 206 and the distal tip portion 215. Also, the nozzle structure 202, in distinction to the above-described nozzle structure 102, has the tubular member 204 defining the inner cavity 214 of the cross-sectional dimension a slightly larger than a diameter b of the filament FM, leaving a small/narrow gap g between the inner walls 210 of the tubular member 204 and the filament FM. In other words, the filament FM when placed in the inner cavity 214 is gapped from the inner walls 210 by gap medium, e.g., air, and does not directly interface with the inner walls 210.

The additional intermediate light ports 226 may be discrete light ports enabling input light from one or more selected intermediate positions along the tubular member 204. For example, the additional intermediate light ports 226 may be configured as optical fiber port formed within the tubular member 204, or regions on walls of the tubular member 204 that are etched by grating to provide suitable input port. Alternatively, or additionally, the intermediate light ports 226 may be configured to allow transmission of light through walls of the tubular member 204 in a path that substantially does not provide light trapping.

Further, in some configurations, the additional intermediate light ports 226 may be continuous, enabling input light beam of a relatively wide cross-section to be transmitted through walls of the tubular member 204 and propagate therein to be absorbed by the filament FM and provide heating thereto. Accordingly, the tubular member 204 is formed of material (e.g., glass) transparent to light of selected wavelength range, allowing input light impinging thereon to be transmitted therethrough to thereby be absorbed by the filament FM. In this connection, light may be directed onto selected regions along the tubular member at a direction intersecting with an axis defined by said elongated tube portion. For example, light may be directed at the tubular member 204 at an angle range between 60 degrees and 120 degrees with respect to an axis defined by said elongated tube portion.

With this configuration, the majority of input light $L^{(1)}_{in}$ entering the tubular member 204 via the light input ports 224 at the proximal portion 206 of the tubular member 204 and interacting with the inner walls 210 (while propagating through the light guiding portion 220) is reflected back towards the interior of the light guiding portion 220 and continues its propagation towards the funnel portion 215 and further distal transmission portion 222.

However, since the gap g is very narrow, a relative refractive index $n_{rel}$ of the medium in such narrow slot/gap is defined by the refractive index $n_1$ of the tube 204 and refractive index $n_f$ of the closely located filament. Such relative refractive index $n_{rel}$ is thus slightly different from the refractive index $n_2$ of air ($n_{rel} \neq n_2$), allowing partial transmission of the input light components $L^{(1)}_{in}$ through the walls 210 towards the inner cavity to be absorbed by the filament FM.

Further, additional input light $L^{(2)}_{in}$ enters the light guiding tube portion 220 via the intermediate light ports 226 such that it is incident onto the inner walls at angles outside those of total internal reflection condition (i.e., non-critical angles), e.g., substantially perpendicular to the longitudinal axis of the tube 220. As illustrated in FIG. 3B, most of this additional input light $L^{(2)}_{in}$ contributes to the heat field transfer to the filament, due to this light transmission through the inner walls 210 towards the inner cavity 214 thus enabling it to be absorbed by the filament FM facilitating its melting. This additional input light $L^{(2)}_{in}$ entering the tube portion 220 via the intermediate light ports 226 is not intended for reaching the printing surface but is intended to be entirely transmitted to the inner cavity to heat the filament. This is obtained by planning the incident angle to be lower than the critical angle for reflection. The intermediate light ports 226 may be fed with light $L^{(2)}_{in}$ by intermediate optical fibers 228 guiding the light from the light sources (not shown) thereto.

It should be noted, although not specifically shown, that, generally such additional intermediate input ports may be used in the nozzle configuration of FIG. 2 as well. i.e., nozzle configuration where the cross-sectional geometry of the inner cavity substantially matches that of the filament and filament thus directly interacts with the inner walls 110 of the tubular member 104.

Figure 4:
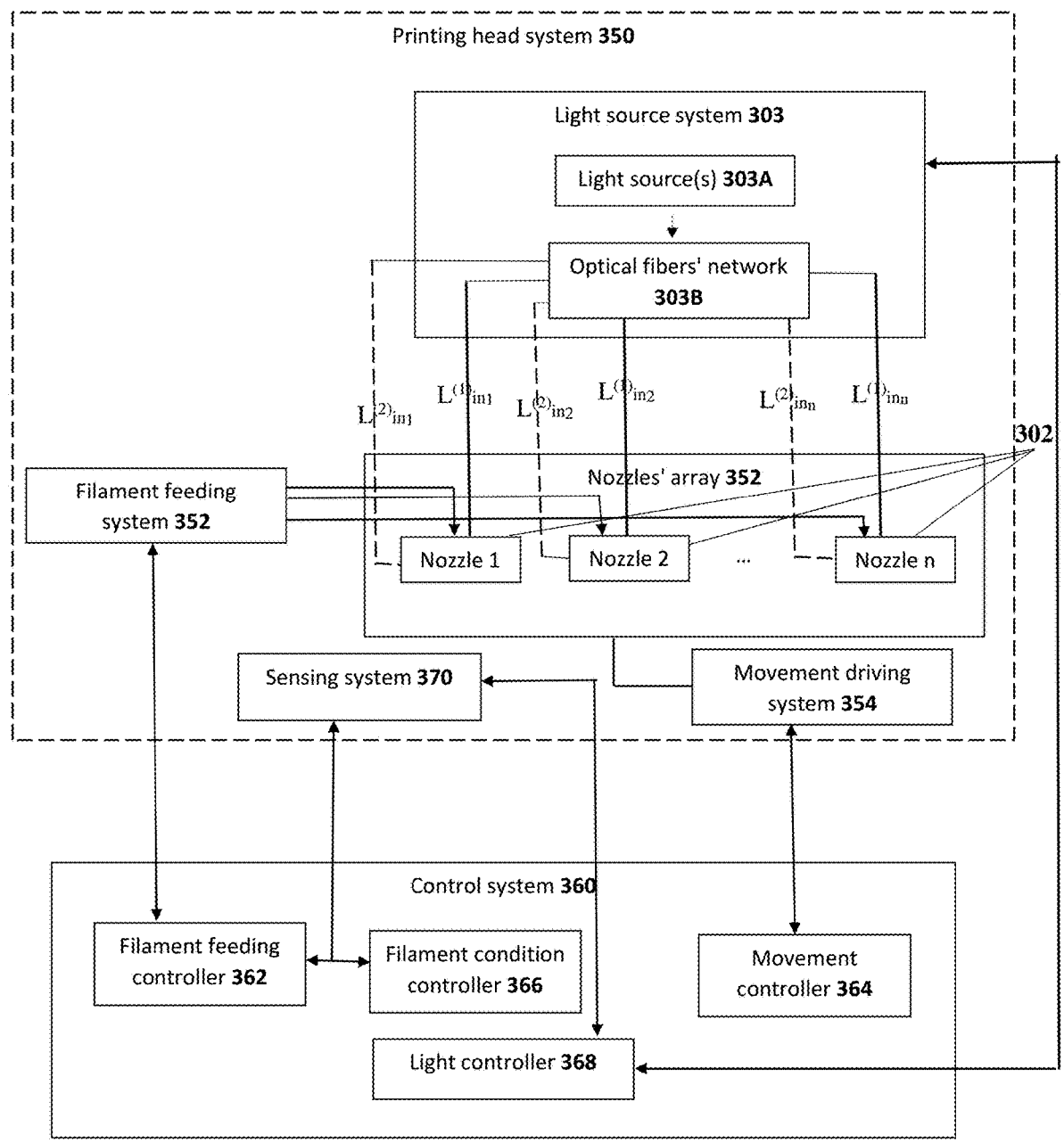
FIG. 4 is a block diagram of an example of the print-head system of the present invention.

The nozzle configuration described above with respect to non-limiting examples is configured to be a part of a print-head system, illustrated in FIG. 4, by way of a block diagram. The printing head system 350 includes a nozzle arrangement 352 including an array N of nozzles, generally at 302, which may be associated with a common light source system 303.

The light source system 303 may include one or more light sources 303A and an optical fiber array/network 302. The optical fiber array 303B is configured such that the plurality of input light ports of each nozzle, on its proximate part, is optically coupled to its dedicated plurality of fibers supplying input light components $L^{(1)}_{in}$, and possibly also, as the case may be, the plurality of intermediate light input ports of each nozzle is optically coupled to its dedicated additional plurality of optical fibers supplying additional input light components $L^{(2)}_{in}$.

The print-head system 350 is properly equipped with various mechanism typically used to manage the printing process, such as for example a filament feeding system 354, movement driving system 356, etc. The print head system is associated with (i.e., includes as its constructional part or is in data communication with a control system 360 controlling the print-head performance during the printing process. The control system 360 operates in accordance with predetermined/prestored print data design, and includes a filament feeding controller 362, a movement controller 364, etc. These and other structural and functional parts of the print-head system are known per se and do not form part of the present invention, and therefore need not specifically described.

The print-head system 350 also includes a sensing system 370 which is configured and operable to determine various parameters and conditions of the nozzle operation, such as filament parameters (e.g., temperature, viscosity), as well as light parameters and light propagation conditions. The sensing system 370 is in data communication with respective utilities 366, 368 of the control system.

Thus, the present invention provides the nozzle configuration enabling its advantageous use in printing techniques, in particular 3D printing, allowing large scale printing with desirably high-speed high-quality printing that can be achieved using a conventional size printer. The nozzle structure of the invention enables to achieve have essential goals/effects such as optimized filament melting pattern towards an output of the nozzle and local pre-heating of a substrate facing the output of the nozzle, which together optimizes the discharged drop formation on the substrate. The configuration of the nozzle (elongated tube portion configured for guiding light by reflections from its inner surfaces, followed by the narrower, tip-like, portion at the distal part of the nozzle configured to affect/change the propagation of light coming from the elongated tube portion to direct it out of the tubular member) together with the light input ports on the proximal part of the tubular member, provide an essential effect to achieve the above goals. The light reflections along the elongated tube portion cause continuous transmission of light field to the inner cavity in a direction from the proximal part towards the distal part of the tubular member. When filament is located in the inner cavity, successive regions of the filament along its length are continuously exposed to the light field causing heating of the filament towards its melting state at the distal part of the tubular member to create a drop of the printing material to be discharged at the distal tip portion onto a location on the printing plane.

The invention claimed is:

1. A nozzle structure for use in a print head for discharging drops of a printing material onto a substrate located in a printing plane, the nozzle structure comprising:
a tubular member having a distal part by which it faces the printing plane when in operation, said tubular member defining an elongated inner cavity along the length of the tubular member for placement of a filament of the printing material in said inner cavity, said tubular member being configured for light propagation through at least a portion thereof, said tubular member comprising light input ports on the proximal part thereof and being configured for light propagation therethrough along a general propagation direction from the proximal part to the distal part; wherein
the light input ports are configured for directing diverging input light beam towards inner surfaces of the tubular member with a predetermined incidence onto said inner surfaces;
the tubular member comprises an elongated tube portion and a distal tip portion at the distal part of the tubular member,
the elongated tube portion of the tubular member is configured and operable as a light guide for trapping input light, entering said elongated tube portion via the light input ports at the proximal part of the tubular member, and guiding the trapped light propagation along the tubular member by reflections from inner surfaces of the tubular member, thereby continuously transferring light to successive regions of said elongated inner cavity from the proximal part of the tubular member towards the distal part thereof; and
distal tip portion of the tubular member has a cross-sectional geometry different from that of the elongated tube portion to affect light reflections from the inner surfaces of the tubular member and allow the trapped light to escape through the distal part of the tubular member towards the printing plane, thereby interacting with and heating a location on the printing plane facing the distal part; and
wherein said tubular member is made of a material with a refractive index substantially matching a refractive index of the filament material.

2. The nozzle structure according to claim 1, wherein the elongated tube portion of the tubular member is configured as a waveguide for guiding the input light propagation along the elongated tube portion towards the distal tip portion by total internal reflection condition.

3. The nozzle structure according to claim 1, wherein the tubular member defines the inner cavity having a cross-section geometry substantially matching that of the filament, such that the filament by its circumference interfaces the surface of the cavity.

4. The nozzle structure according to claim 3, wherein the tubular member is made of a material with a refractive index substantially matching a refractive index of the filament material, such that when the inner cavity if filled by the filament, an elongated structure formed by the tubular member and the filament is configured and operable as a light guide for trapping the input light and guiding its propagation along said elongated structure while continuously heating the filament due to light absorption by the filament along its length towards a distal part of the filament aligned with the distal tip portion of the tubular member.

5. The nozzle structure of claim 1, wherein the tubular member further comprises one or more additional intermediate light input ports located on the elongated tube portion downstream of the proximal part with respect to said general propagation direction of light.

6. A nozzle structure for use in a print head for discharging drops of a printing material onto a substrate located in a printing plane, the nozzle structure comprising:
a tubular member having a distal part by which it faces the printing plane when in operation, said tubular member defining an elongated inner cavity along the length of the tubular member for placement of a filament of the printing material in said inner cavity, said tubular member being configured for light propagation through at least a portion thereof, said tubular member comprising light input ports on the proximal part thereof and being configured for light propagation therethrough along a general propagation direction from the proximal part to the distal part; wherein
the light input ports are configured for directing diverging input light beam towards inner surfaces of the tubular member with a predetermined incidence onto said inner surfaces;
the tubular member has comprises an elongated tube portion and a distal tip portion at the distal part of the tubular member,
the elongated tube portion of the tubular member is configured and operable as a light guide for trapping input light, entering said elongated tube portion via the light input ports at the proximal part of the tubular member, and guiding the trapped light propagation along the tubular member by reflections from inner surfaces of the tubular member, thereby continuously transferring light to successive regions of said elongated inner cavity from the proximal part of the tubular member towards the distal part thereof; and
distal tip portion of the tubular member has a cross-sectional geometry different from that of the elongated tube portion to affect light reflections from the inner surfaces of the tubular member and allow the trapped light to escape through the distal part of the tubular member towards the printing plane, thereby interacting with and heating a location on the printing plane facing the distal part; and
wherein the tubular member further comprises one or more additional intermediate light input ports located on the elongated tube portion downstream of the proximal part with respect to said general propagation direction of light and, wherein each of said one or more of the intermediate light input ports is configured to direct light being input through said intermediate light input port towards inner walls of the tube portion facing the inner cavity in an angle allowing transmission of said light towards the inner cavity.

7. The nozzle structure of claim 1, wherein each of the light input ports is configured and arranged such that an entrance angle and position of the input light port on the light guiding body provides a desired relation between amount of the light field being transferred into the inner cavity and amount of light field being output from the distal tip portion towards a location on the printing surface, to thereby satisfy a predetermined criteria for a relation between energy for the filament melting and energy for the local heating of the printing surface.

8. The nozzle structure of claim 1, wherein said tubular member is further configured to allow transmission of light on a path intersecting to axis defined by said elongated tube portion, thereby enabling input light beamed toward the tubular member externally of said nozzle structure to pass through said tubular member and further interact with and heat filament inside said tubular member.

9. A print-head system, comprising:
a nozzle arrangement comprising an array of nozzles configured for discharging a printing material onto a substrate located in a printing plane; and a light source system configured and operable to produce a plurality of light beams and optically couple said plurality of light beams to the light input ports on the tube portions of the tubular members of the nozzles; the nozzle structure including:
a tubular member having a distal part by which it faces the printing plane when in operation, said tubular member defining an elongated inner cavity along the length of the tubular member for placement of a filament of the printing material in said inner cavity, said tubular member being configured for light propagation through at least a portion thereof, said tubular member comprising light input ports on a proximal part thereof and being configured for light propagation therethrough along a general propagation direction from the proximal part to the distal part; wherein
the light input ports are configured for directing diverging input light beam towards inner surfaces of the tubular member with a predetermined incidence onto said inner surfaces;
the tubular member comprises an elongated tube portion and a distal tip portion at the distal part of the tubular member,
the elongated tube portion of the tubular member is configured and operable as a light guide for partially trapping input light, entering said elongated tube portion via the light input ports at the proximal part of the tubular member, and guiding the trapped light propagation along the tubular member thereby continuously transferring said input light to successive regions of said elongated inner filament-filled cavity from the proximal part of the tubular member towards the distal part thereof; and
distal tip portion of the tubular member has a cross-sectional geometry different from that of the elongated tube portion to affect light reflections from the inner surfaces of the tubular member and allow the partially trapped light to exit through the distal part of the tubular member towards the printing plane, thereby interacting with and heating a location on the printing plane facing the distal part;
wherein each of said one or more of the intermediate light input ports is configured to direct light being input through said intermediate light input port towards inner walls of the tube portion facing the inner cavity in an angle allowing transmission of said light towards the inner cavity.

10. The print-head system of claim 9, wherein the light source system comprises a plurality of light sources, each one or more of the light sources being directly optically coupled to respective one or more light input ports of the respective one of the nozzles in said array of nozzles.

11. The print-head system of claim 9, wherein the light source system comprises one or more light sources and a plurality of optical fibers, wherein each of the optical fibers is by its one end optically coupled to the light source and by its other end is optically coupled to a dedicated one of said light input ports.

12. The print-head system of claim 9, wherein the light source system comprises a plurality of light sources and a plurality of optical fibers, said nozzles comprising the light input ports directly optically coupled to the light sources, and the light input ports optically coupled to the light sources via the optical fibers.

13. The print-head system of claim 9, wherein the light source system is configured to generate light of at least one visible and infrared spectra.

14. The print-head system of claim 9, wherein the light source system comprises one or more lasers.

15. The print-head system of claim 9, comprising a sensing system for sensing one or more of parameters of the filament material.

16. The print-head system of claim 9, comprising a sensing system for sensing one or more of parameters of the light being input to and propagating through the nozzles and generating sensing data, thereby enabling adjustment of the light source system in accordance with the sensing data.

17. The print-head system of claim 9, wherein the tubular member further comprises one or more additional intermediate light input ports located on the elongated tube portion downstream of the proximal part with respect to said general propagation direction of light.

18. The print-head system of claim 9, wherein said tubular member is further configured to allow transmission of light on a path intersecting to axis defined by said elongated tube portion, thereby enabling input light beamed toward the tubular member externally of said nozzle structure to pass through said tubular member and further interact with and heat filament inside said tubular member.

* * * * *